(12) United States Patent
Hermey et al.

(10) Patent No.: US 12,234,884 B2
(45) Date of Patent: Feb. 25, 2025

(54) ENERGY GUIDE CHAIN HAVING LATERALLY STABILIZED LINK PLATES MADE OF PLASTIC

(71) Applicant: IGUS GMBH, Cologne (DE)

(72) Inventors: Andreas Hermey, Hennef (DE); Thilo-Alexander Jaeker, Sankt Augustin (DE); Stefan Strack, Koenigswinter (DE); Georg Theiss, Cologne (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 17/310,187

(22) PCT Filed: Jan. 24, 2020

(86) PCT No.: PCT/EP2020/051806
§ 371 (c)(1),
(2) Date: Jul. 23, 2021

(87) PCT Pub. No.: WO2020/152349
PCT Pub. Date: Jul. 30, 2020

(65) Prior Publication Data
US 2024/0026952 A1    Jan. 25, 2024

(30) Foreign Application Priority Data

Jan. 25, 2019  (DE) .................... 20 2019 100 466.5

(51) Int. Cl.
*F16G 13/16*   (2006.01)
*H02G 11/00*   (2006.01)

(52) U.S. Cl.
CPC ........... *F16G 13/16* (2013.01); *H02G 11/006* (2013.01)

(58) Field of Classification Search
CPC .............................. F16G 13/16; H02G 11/006
(Continued)

(56) References Cited

U.S. PATENT DOCUMENTS

| 4,813,224 A | 3/1989 | Blase |
| 5,108,350 A | 4/1992 | Szpakowski |

(Continued)

FOREIGN PATENT DOCUMENTS

| BR | 112021013937 A2 * | 9/2021 | ............. F16G 13/16 |
| CN | 1244238 | 2/2000 | |

(Continued)

OTHER PUBLICATIONS

International Search Report from corresponding PCT Appln. No. PCT/EP2020/051806, dated May 25, 2020.
(Continued)

*Primary Examiner* — Taylor Morris
(74) *Attorney, Agent, or Firm* — Grossman, Tucker, Perreault & Pfleger, PLLC

(57) ABSTRACT

Cable carriers having laterally stabilized tabs made of plastic. An arc-shaped guide region of one tab engages in a free space behind a retaining nub on the other tab. The retaining nub provides lateral stabilization. According to the invention, the retaining nub is spatially limited to a middle height section of the tab height and limited in dimension in the circumferential direction about the pivot axis. The arc-shaped guide region is thus overlapped solely by a smaller proportion, preferably ≤33%, of the arc length or angle width thereof by the retaining nub and remains not overlapped (that is, laterally free) over a predominant proportion, particularly 66%, of the arc length or angle width thereof by the retaining nub. This particularly facilitates the assembly of the chain tabs and their connection to each other.

18 Claims, 3 Drawing Sheets

(58) Field of Classification Search
USPC .......................................................... 248/70
See application file for complete search history.

(56) References Cited

U.S. PATENT DOCUMENTS

| | | | | |
|---|---|---|---|---|
| 5,220,779 | A | * | 6/1993 | Tatsuta ................ H02G 11/006 59/900 |
| 5,768,882 | A | * | 6/1998 | Weber .................... F16L 3/243 59/900 |
| 5,980,409 | A | | 11/1999 | Blase |
| 5,987,873 | A | * | 11/1999 | Blase ..................... F16G 13/16 59/900 |
| 6,190,277 | B1 | | 2/2001 | Blase |
| 6,387,002 | B1 | | 5/2002 | Gunter |
| 6,425,238 | B1 | * | 7/2002 | Blase .................. H02G 11/006 248/51 |
| 6,688,096 | B2 | * | 2/2004 | Wada ..................... F16G 13/16 59/900 |
| 7,243,486 | B1 | * | 7/2007 | Ikeda ................... H02G 11/006 248/51 |
| 7,877,978 | B2 | | 1/2011 | Heppner et al. |
| 8,806,847 | B2 | | 8/2014 | Blase et al. |
| 11,300,182 | B2 | | 4/2022 | Dommnik et al. |
| 2004/0195832 | A1 | | 10/2004 | Ikeda et al. |
| 2017/0138440 | A1 | * | 5/2017 | Jaeker .................... F16G 13/16 |
| 2018/0051773 | A1 | | 2/2018 | Komiya |
| 2022/0082184 | A1 | * | 3/2022 | Hermey .................. F16L 3/015 |
| 2022/0140590 | A1 | * | 5/2022 | Dommnik .............. H02G 11/00 174/68.1 |

FOREIGN PATENT DOCUMENTS

| | | | | | |
|---|---|---|---|---|---|
| CN | 103502687 | | | 1/2014 | |
| CN | 107636346 | A | * | 1/2018 | ............ F16G 13/16 |
| CN | 109477551 | | | 3/2019 | |
| CN | 111102323 | A | * | 5/2020 | |
| CN | 113339457 | A | * | 9/2021 | |
| CN | 114776764 | A | * | 7/2022 | |
| CN | 114962551 | A | * | 8/2022 | ............ F16G 15/12 |
| DE | 3531066 | | | 3/1987 | |
| DE | 19701706 | C1 | * | 9/1998 | ............ F16G 13/16 |
| DE | 19715531 | A1 | * | 10/1998 | ............ F16G 13/16 |
| DE | 29821259 | U1 | * | 6/1999 | ............ F16G 13/16 |
| DE | 10012298 | A1 | * | 11/2001 | ............ F16G 13/16 |
| DE | 202011004762 | U1 | * | 10/2011 | ............ F16G 13/16 |
| DE | 202012003903 | U1 | * | 7/2012 | ............ B65G 15/30 |
| DE | 202015101773 | U1 | * | 6/2015 | ............ F16G 13/16 |
| DE | 202015101707 | U1 | * | 11/2015 | ............ F16G 13/16 |
| DE | 112016001315 | | | 12/2017 | |
| DE | 202019100434 | U1 | * | 7/2019 | ............ F16G 13/16 |
| DE | 202019100465 | U1 | * | 7/2019 | ............ F16G 13/16 |
| DE | 202019101354 | U1 | * | 7/2019 | ............ F16G 13/14 |
| DE | 202019100877 | U1 | * | 4/2020 | ............ F16G 13/16 |
| DE | 202020105121 | U1 | * | 11/2021 | ............ F16G 13/16 |
| EP | 1703168 | A2 | | 9/2006 | ............ F16G 13/16 |
| FR | 2661728 | A1 | * | 11/1991 | ............ F16G 13/16 |
| JP | 5-141481 | | | 6/1993 | |
| JP | 2000-120807 | | | 4/2000 | |
| JP | 2005-048953 | | | 2/2005 | |
| KR | 20100099840 | A | * | 9/2010 | ............ F16B 13/16 |
| KR | 20220161230 | A | * | 12/2022 | ........... H02G 11/006 |
| WO | 9504231 | | | 2/1995 | |
| WO | 9846906 | | | 10/1998 | |
| WO | WO-2013157819 | A1 | * | 10/2013 | ............ F16G 13/16 |
| WO | WO-2015185978 | A1 | * | 12/2015 | ............ F16G 13/16 |

OTHER PUBLICATIONS

International Preliminary Report on Patentability from corresponding PCT Appln. No. PCT/EP2020/051806, dated May 4, 2021.
Office Action from related Japanese Appln. No. 2021-542452, dated Dec. 5, 2023. English translation attached.
Office Action from related Singaporean Appln. No. 11202108142W, dated Apr. 20, 2023.
Office Action from related Chinese Appln. No. 202080015665.3, dated Nov. 21, 2022. English translation attached.
Office Action from related Indian Appln. No. 202137033952, dated Jan. 19, 2023, English translation attached.

* cited by examiner

ENERGY GUIDE CHAIN HAVING LATERALLY STABILIZED LINK PLATES MADE OF PLASTIC

FIELD

The present invention relates in general to the field of energy guide chains for dynamic guidance of lines between two connection points which are mobile relative to one another. Energy guide chains typically have chain links each with two opposing plates (also known as side plates or side pieces), which are connected together, either permanently or detachably, by way of at least one, generally two crosspieces. The chain links define an interior receiving space for guiding the lines, such as for example cables for supplying signals or power or pneumatic or hydraulic hoses.

The present invention relates to the construction or design of the link plates taken alone, and in particular plates which are made from plastics material, particularly preferably by the injection molding method. Two types have proven very effective specifically in energy guide chains comprising plastics plates.

BACKGROUND

In a first type, the energy guide chain, as described for example in WO 95/04231 A1, has two strings of plates, which are each constructed from two different kinds of plates, namely consisting of an alternating succession of inner plates and outer plates, in each case of different configuration. In this case, the inner plates have inner overlap regions facing the inside of the chain and the outer plates have outer overlap regions. Adjacent plates in each case overlap on one side with their overlap regions and are connected suitably articulatedly thereto, such that they are swivelable relative to one another in a plane about a swivel axis. The swivelable connection typically takes the form of a stud/hole or pin/receptacle revolute joint. Each plate of the first type is typically flat in plan view, with overlap regions at the ends lying in a plane.

In the case of the second type, the energy guide chain has two strings of plates, which are constructed from in each case identical "offset" plates, in particular of plastics material. Such a plate, as shown for example in DE 3 531 066 C2 or U.S. Pat. No. 4,813,224 A, has a first overlap region on the inside and a second overlap region staggered or offset laterally outwardly relative thereto. In plan view, the offset plate generally has a contour similar to an elongate Z shape. Offset plates are also connected together swivelably in a plane with unilaterally overlapping overlap regions, likewise typically by way of a pin/receptacle revolute joint.

The invention is equally applicable to plates of plastics material of both the above-stated types. With the second type, typically identically constructed offset plates are used in each string of plates, wherein the offset plates of the one string are mirror-symmetrical to those of the opposing string. In energy guide chains with inner/outer plates or of the first type, each plate may be usable in each string of plates. Furthermore, it is possible in the case of the first type, as proposed in WO 98/46906 A1, to configure plates of the first type in such a way that the plate in each string is usable when rotated by 180°, so as to define different stop angles depending on orientation, for example for the purpose of pretensioning. The invention is particularly advantageously, but not exclusively, applicable to an inner plate of this type.

Generic link plates of plastics material of both types, i.e. alternatingly connectable inner/outer plates or offset plates, are in each case embodied for solely one-sided overlap of adjacent overlap regions. The present invention therefore does not relate to "forked" plates. This fundamentally different design has a fork-shaped end which is approximately U-shaped in plan view and into which the adjacent plate engages and is overlapped on both sides. This design has not become established, in any event in the case of plastics plates, inter alia due to the high material requirements and resultant weight.

In energy guide chains, in self-supporting applications in particular (if the upper run extends in self-supported manner over the lower run), in the case of long travel paths or indeed in the case of horizontal applications, high transverse forces or torque arise, which requires high lateral stability of the plate connection. This is particularly important in the case of plates overlapping only on one side. It is for example essential to prevent articulated joints from coming undone due to transverse forces in ongoing operation.

For the first chain type, WO 95/04231 A1 proposed, for example, that the crosspieces are flared at their ends at least on the outer plates in such a way that they engage over the overlap region of the adjacent inner plates and at the same time act as a safeguard against separation of the plates transversely of the longitudinal direction.

To improve the lateral stability of the two plate types, in patent EP 0 803 032 B1 or U.S. Pat. No. 5,980,409 A the applicant proposed a more extensive solution. It is here proposed for both types that with in each case two plates succeeding one another in the string of plates, the one plate engages with a circular arc-shaped guide region extending parallel to the swivel plane into a space behind a protruding retaining projection of the other plate. Engagement of the guide region of the one plate behind the retaining projection on the other plate results in higher lateral stability.

This prior art (considered the closest) has proven effective for increasing the lateral stability of generic energy guide chains according to EP 0 803 032 B1. It is however associated with a number of restrictions relating to plate configuration, in particular relating to structural design latitude of the limit stops needed for limiting the swivel angle and/or the dimensioning of the pin or receptacle for the swivel joint. For assembly of a string of plates, it is namely essential, for the purpose of inserting the guide region into the guide groove extending over almost 180°, for the plates to be assembled with an oblique introduction direction. Play-free engagement behind the retaining projection, however, necessitates a relatively acute or very small insertion angle of the plate with guide region into the plate with retaining projection. This acute introduction or insertion angle, in turn, does not enable any desired position of the limit stops for swivel angle limitation at the overlap region and restricts the dimensioning of the likewise laterally protruding swivel pin.

To compensate, EP 0 803 032 B1 has already proposed providing beveled edges or insertion bevels, inter alia on the hinge pin, on the retaining projection and on subportions of the guide region, by means of which the insertion angle can be slightly enlarged. This is satisfactory only to a limited degree. It moreover does not allow a largely free arrangement and number of stop projections or corresponding cutouts on the overlap regions. In addition, the complexity of the plate's geometry is increased.

On the other hand, the geometric complexity of the side plates according to EP 0 803 032 B1, in particular the production of a guide groove with sufficiently small tolerances, requires complex injection molding tools with mobile parts, such as sliders for the undercuts etc. This in turn increases the price of the tools, makes them more susceptible to failure when in operation and moreover requires relatively long cycle times in the injection molding machine.

DE 11 2016 001 315 T5 describes plastics plates which may engage behind one another in part only in the two end positions of the plates swivelable relative to one another. Thus, reliable lateral stabilization cannot be achieved over the entire length or all operating states.

Patents EP 2 005 025 B1 or U.S. Pat. No. 7,877,978 B2 describe plates of metal, in particular two-dimensional sheet metal plates, with a projection produced by deformation, e.g. by deep drawing and behind which the next plate engages. The design and production of sheet metal plates cannot however be applied without further ado to plastics plates.

SUMMARY

A first object of the present invention is therefore further to develop generic energy guide chains or link plates, in particular of plastics material, with a lateral stabilizing function to the effect that the design latitude is improved, in particular with regard to the swivel angle limit stops and/or swivel joint connections. A link plate design is preferably at the same time proposed which allows production in a mold which is simplified relative to the prior art, i.e. reduces production costs.

This is achieved according to the invention simply in that the retaining projection has a markedly shorter dimension in the swivel direction compared with the prior art, in particular relative to the dimension of the circular arc-shaped guide region in the circumferential direction, at least relative to the dimension effective or entering into engagement over the entire swivel angle. A retaining projection extending over a noticeably shorter dimension in the circumferential direction about the circular arc of the swivel motion namely ensures that the engaging plate may be inserted behind the retaining projection of the retaining plate at a markedly greater angle relative to the plate plane of said retaining plate. This in turn increases design latitude inter alia with regard to the size and/or arrangement of functional components protruding in the overlap regions, in particular with regard to the number and dimensioning of the stop projections and/or dimensioning of the swivel pin.

According to the invention, the first object may thus be achieved simply in that each retaining projection is of limited dimension in the circumferential direction around the swivel axis, such that the circular arc-shaped guide region of an engaging plate, in particular relative to its effective circumferential dimension and in each swivel position, is predominantly not engaged over by the retaining projection, this being the case in particular irrespective of the swivel position or in each swivel position. Geometrically defined, this may be achieved if each retaining projection is of limited dimension in the circumferential direction relative to the relative swivel movement or around the adjacent swivel axis, such that the circular arc-shaped guide region of the adjoining or engaging plate is not engaged over by the retaining projection over a predominant proportion of the arc length or angular width of the circular arc-shaped guide region. This is intended to be the case irrespective of the swivel position or in any relative swivel position of the two plates, so as to simplify assembly from different directions. In this case, it may in particular be provided that all in all at least two thirds or more of the circular arc-shaped guide region is respectively not engaged over by the retaining projection due to the circumferentially limited dimensioning thereof. The arc length of the guide region configured to be substantially circular arc-shaped in the swivel plane is here understood to be at least the arc length which is effective over the entire travel of the admissible relative swiveling movement or enters into engagement, said arc length being dependent on the swivel angle limitation. In the case of a conventional circular arc shape, extending therebeyond, of the guide region, in particular also the entire arc length thereof is considered (corresponding to the largest provided swivel angle or smallest deflection arc), always relative to the associated swivel axis, i.e. the center point of the circular arc shape.

In this case, in particular the arc length at the front end of the guide region is considered. When considering the angle, the position of the considered arc is irrelevant. In other words, for the purposes of the invention the first object may thus be simply achieved in that each retaining projection is delimited in the circumferential direction with regard to the relative swiveling movement such that the circular arc-shaped guide region of the engaging plate is never engaged over by the retaining projection over a predominant proportion of the angular width of the circular arc-shaped guide region or remains laterally free toward the outside.

As a corollary, the object may thus simply be achieved in that the retaining projection is delimited in the circumferential direction relative to the swivel axis in such a way that, in any swivel position, the circular arc-shaped guide region is overlapped over only a comparatively small proportion of its arc length or a small proportion of its angular width, for example less than one third, by the retaining projection. In a nutshell, the retaining projection has a comparatively short structural length which is effective for engagement in this circumferential direction. This may be minimized to the dimension necessary for lateral stability. The arc length or angular width, which is effective for engagement, of the retaining projection may in particular represent a uniformly small proportion of the arc length or angular width of the guide region, preferably <⅓ or 33%, in every relative swivel position of the plates.

According to a further independent approach to solving the problem, the object is simply achieved, irrespective of the dimensioning of the guide region, in that all or each of the retaining projections of the plate serving in lateral stabilization are/is dimensioned such that they/it are/is arranged solely within an angular range α<60°, preferably ≤45°, bisected by the longitudinal central plane of the plate, about the adjacent swivel axis (i.e. with the vertex of the angle on this swivel axis). The adjacent swivel axis in this case denotes the swivel axis of that overlap region over or in which the respective retaining projection protrudes. The longitudinal central plane of the plate here denotes, notwithstanding a central position, a plane which contains both swivel axes of the plate under consideration or is defined by these swivel axes and extends lengthwise. The vertical central plane below denotes the central plane of the plate perpendicular to its longitudinal direction.

Simplification of assembly or greater design latitude avoids this arrangement by any retaining projections or subregions of such being provided on the plate outside the above-stated angular range. This applies in particular for both sides of an offset plate or both overlap regions of an inner/outer plate.

The retaining projection thus does not engage over, as still proposed with the preferred examples from EP 0 803 032 B1, a predominant proportion of the arc length of the guide region, but rather always merely a comparatively small proportion. The retaining projection may in this case in particular be spatially limited to the central subregion or vertical portion of the plate height.

Preferably precisely just one retaining projection is provided for each overlap region to be retained, said projection being configured preferably centrally relative to the plate height, in particular symmetrically with regard to the longitudinal central plane of the plate. Also conceivable is a subdivision with for example two smaller retaining projections within the limited angular range α<60°, preferably ≤45°, about the adjacent swivel axis. Furthermore, the retaining projection may assume the most varied forms.

The configuration according to the invention is equally applicable to chains or plates of the first type or to chains or plates of the second type, in particular to plastics plates. Features relating to lateral stabilization, as defined above or in these claims, are in principle mutually interchangeable and individually combinable, as well as individually to be regarded as essential to the invention.

Notwithstanding plate type, the overlap regions are for example typically connected in one piece by way of a centrally arranged central region manifested for instance at the halfway division point of the length of the chain link. The central region typically at least in places has a greater (wall) thickness perpendicular to the swivel plane than in the overlap regions. Preferably, the retaining projection protrudes in one piece from the central region or is connected in one piece thereto. Thus, each retaining projection may preferably be connected to the rest of the body of the plate via a connection region with a (wall) thickness greater even than the retaining projection.

A plate according to the invention is either an inner plate or outer plate (first type) or indeed an offset plate (second type), and is particularly preferably made of plastics material by injection molding, in particular in one piece or from a single shot. The term plastics plates here denotes plates which are produced at least predominantly or entirely of plastics material, in particular in a method of primary forming from the plastic state (cf. DIN 8580), preferably by injection molding.

With plates of the first type, retaining projections are preferably provided at least on the outside of the inner plate, into which guide regions of the overlapping outer plates engage. Lateral stabilization of the end regions of the inner plates, on the other hand, may be simply achieved by suitable crosspieces or opening bars on the outer plates, i.e. further retaining projections on the outer plates are advantageous only to a limited degree. In the arrangement proposed here, retaining projections may however additionally or alternatively also be provided on the inside of the outer plate.

A swivel pin or a matching swivel pin receptacle for forming the revolute or swivel joint connection, irrespective of plate type, may alternatively equally well be provided on the inner or outer overlap region.

In one preferred embodiment, the retaining projection is delimited in the circumferential direction about the adjacent or proximal swivel axis of the engaging guide region such that the circular arc-shaped guide region is covered in each swivel position over a maximum angle about the swivel axis amounting to <60°, preferably ≤45°. The smallest possible angular width of the overlap allows the largest possible insertion angle on assembly of the plates.

In order, in terms of the swivel plane, to achieve the smallest possible, most material-saving ratio between the engaged-over or covered arc area of the guide region and the free arc area thereof, it is advantageous for the depth to which the circular arc-shaped guide region engages radially into the space covered by the retaining projection to be comparatively small. This may in particular be less than 15% and preferably less than or equal to 12.5% of the circular arc radius of the guide region measured from the front-end edge of the guide region to the swivel axis of the guide region.

In addition to reducing the undercut, a particularly advantageous simplification of the mold may be achieved if every retaining projection at least in part covers a plate opening which extends from the inside of the retaining projection through a or the central region of the plate to the remote side surface of the plate. If the retaining projection is formed over an opening through the plate, no slider is needed for producing an undercut. Notwithstanding this, an opening through the side plate may advantageously be configured such that the insertion angle may be further enlarged because the engaging plate, on introduction into the space behind the retaining projection, may in part project into the opening open to the space.

The design with plate opening associated with the retaining projection is particularly advantageous in the case of an inner or outer plate of relatively shallow construction. In this case, provision is preferably made for two retaining projections remote from one another to cover a common plate opening through the central region. For stability's sake, the opposing retaining projections may be formed in one piece with a reinforced material bridge over the plate opening, which bridges the plate opening for example in the direction of the plate height. This geometry can be straightforwardly produced in one mold tool half by a fixed projection molded to match the opening and optionally the bridge. It is furthermore additionally or alternatively feasible, for example to preserve tensile strength despite a unilateral plate opening, for a material bridge to be provided in the longitudinal direction of the plate and for each retaining projection to be configured as it were in two parts or with an interruption for example in the vertical central plane of the plate.

For reasons of strength, a suitable plate opening should have an edge-free outline in the plate main plane or swivel plane. The outline may preferably be substantially elliptical, in any event completely rounded.

The plate opening in the outline is preferably constructed to match precisely or be flush with the free end of the retaining projection, i.e. the edge of the plate opening facing the overlap region is in each case congruent with the protruding edge of the retaining projection. This inter alia prevents an undesired gap relative to the inner space.

The short operative length of the retaining projection offers greater design latitude relative to EP 0 803 032 B1 with regard to the swivel stops in both plate types. In one embodiment, for example, one overlap region has at least three, preferably four stop projections, which are produced in one piece with the plate body and which in each case form two mutually remote planar stop surfaces, preferably perpendicular to the swivel plane. Corresponding thereto, the complementary overlap region may have at least three, preferably four corresponding stop pockets for receiving the stop projections, which are provided as recesses, for example, in the plate body and in each case form two opposing planar stop surfaces, preferably perpendicular to the swivel plane, for swivel angle limitation with a corresponding stop surface of a stop projection. The stop projections or stop pockets are in this case preferably distributed uniformly or rotationally symmetrically about the swivel axis. It is thus in particular possible to arrange stop elements such as stop projections and stop pockets wholly or in part in the inner subregion of each overlap region, in particular in the quadrant about the swivel axis which itself includes the central region of the plate or the retaining projection. In addition, a greater number of stop surfaces and thus total area also increases the load capacity or self-supporting length.

In one embodiment, the overlap region which engages with its guide region into the space of the retaining projection, in each case has the stop projections and a swivel pin made in one piece. In this case, the stop projections and the swivel pin or the swivel receptacle may be positioned laterally staggered relative to the guide region in the transverse direction and/or project from the swivel plane opposite the retaining projection.

To avoid interfering edges, the retaining projection preferably does not protrude laterally beyond the outer surface of the plate. The retaining projection may in this case be arranged laterally to the outside or inside on the link plate and preferably terminate flush with the outer plate surface. With the first type, retaining projections are preferably arranged at least on the outside of the central region of the inner plate. In the case of offset plates, the retaining projection may be provided in particular on the plate inside of the central region.

Preferably, the retaining projection has an inner retaining surface for overlapping the guide region, which surface is embodied at least predominantly, in particular very largely or entirely parallel to the swivel plane. Owing to the dimensioning according to the invention of the retaining projection, the inner retaining surface may in particular be embodied without an internal insertion bevel.

With regard to favorable arrangement and dimensioning of the retaining projection, a further development provides that each retaining projection is embodied mirror-symmetrically to the longitudinal central plane of the plate and/or each retaining projection is arranged centrally relative to the plate height, in particular in each case with an identical distance from the opposing narrow sides of the plate, both serving inter alia in the prevention of torsional forces during operation. Each retaining projection preferably has an effective height dimension which preferably amounts to at most 40% of the plate height. The effective height dimension here denotes the height which may actually be engaged behind by the matching guide region.

Furthermore, a projection-less transverse wall region may be located on each side, mirror-symmetrically relative to the retaining projection, which transverse wall region extends in particular substantially perpendicular to the swivel plane and adjoins the retaining projection. Each transverse wall region preferably extends concavely relative to the adjacent swivel axis, in particular with a circular arc-shaped course in a portion adjoining the retaining projection, with just a small gap relative to the opposing guide region of the engaging plate. Each projection-less transverse wall region may in each case have an angular width in the circumferential direction about the adjacent swivel axis which is greater than or equal to the effective covering angle of the retaining projection. In the case of a plate opening, such projection-less transverse wall regions may end toward the plate center at this opening.

In one embodiment, the edge, protruding relative to the adjacent swivel axis, of the retaining projection has at least one subportion which bulges outward substantially convexly relative to the swivel axis. A convex bulge has the advantage that precise orientation is not needed for assembly purposes and a maximum area of over-engagement is achievable. The central height portion of the edge may be convexly curved or indeed of for example linear embodiment. The protruding edge should in each case protrude no further, in the longitudinal direction, than permitted by the achievable maximum insertion angle.

Provision may moreover be made for the circular arc-shaped guide region for engagement behind the retaining projection to be a circular arc segment protruding at the front end on the overlap region, which segment has a cross-section which is constant throughout over substantially the entire arc length or angular width thereof (apart possibly from end transitions).

Preferably, this cross-section is set back relative to the outer surface of the overlap region or its smallest wall thickness is smaller relative to the adjoining region of the overlap region. Furthermore, the circular arc segment may on the outside have a planar outer surface and on the inside an insertion bevel, preferably an inner surface which tapers toward the front end, in particular is conical, in order further to increase the insertion or introduction angle. Furthermore, the circular arc segment may have a smaller thickness than the adjoining part of the overlap region, which thickness should amount to only a fraction, in particular at most 50% of the greatest wall thickness of the adjoining part of the overlap region (where the latter has no material recess). Furthermore, the circular arc-shaped guide region and the swivel pin or the swivel receptacle may be arranged on the plate laterally staggered relative to one another in the transverse direction, i.e. not intersecting when viewed parallel to the swivel plane.

In principle, the retaining projection and/or the guide region may be arranged such that the guide region engages substantially over the entire region of the relative swivel angle of two swivelably connected plates into the space of the retaining projection, i.e. is retained in each intended swivel position laterally by the retaining projection. This also enables longer-lasting laterally or horizontally self-supporting use of the energy chain.

The above embodiments are particularly advantageously applicable to link plates for energy chains which are made in one piece from an injection-moldable plastics material, in particular fiber-reinforced thermoplastic.

The invention relates not only to an energy guide chain of the first or second type but also to the individual link plates therefor and pairwise connection thereof, in each case with the lateral stabilization according to the invention.

BRIEF DESCRIPTION OF THE DRAWINGS

Further features and advantages of the invention may be inferred without limitation of the scope of protection from the following, more detailed description of preferred exemplary embodiments made on the basis of the appended figures, in which, purely by way of example.

DETAILED DESCRIPTION

FIGS. 1A-3A show, in a first embodiment, an inner plate 101 and an outer plate 102 for constructing a string of plates (cf. FIG. 3A) of an energy guide chain through alternating linking of inner and outer plates 101, 102. For per se known details of energy guide chains with different inner and outer plates, reference is made, for brevity's sake, to WO 98/46906 A1, EP 0 803 032 B1 or WO 95/04231 A1, the relevant teaching of which is included herein by reference.

Figure 1A:
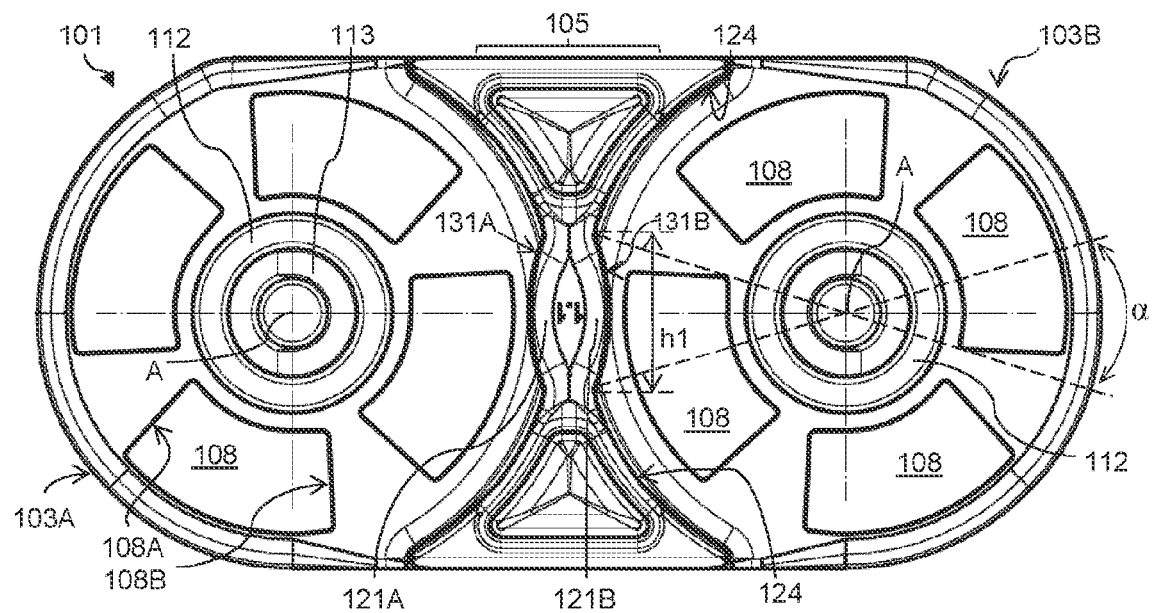
FIGS. 1A-1C are views of an inner plate of a first embodiment according to the invention, in side view from the outside remote from the interior of the chain (FIG. 1A) and from the inside (FIG. 1B) and in partial longitudinal section (FIG. 1C) through two symmetrical retaining projections along section line C-C of FIG. 1B.
Figure 1B:
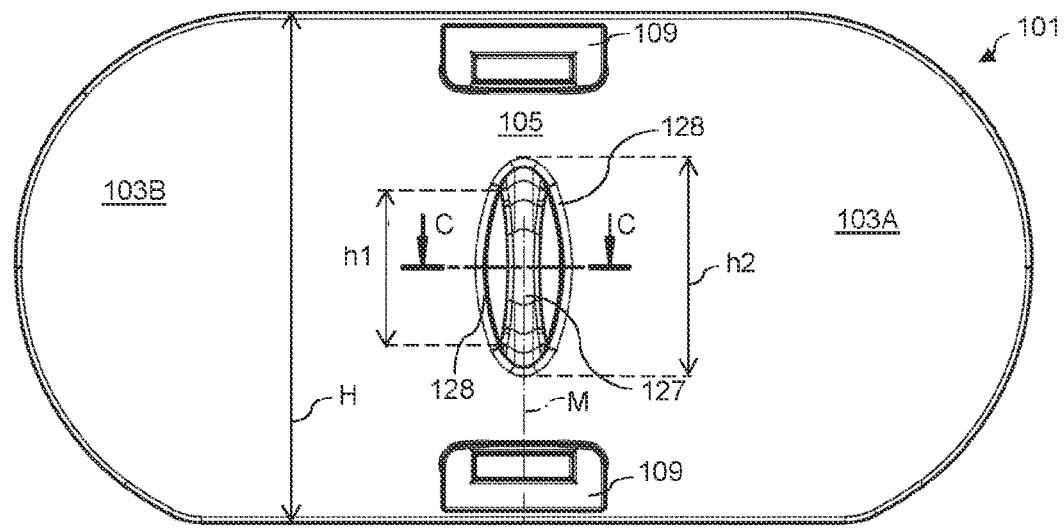
Figure 2A:
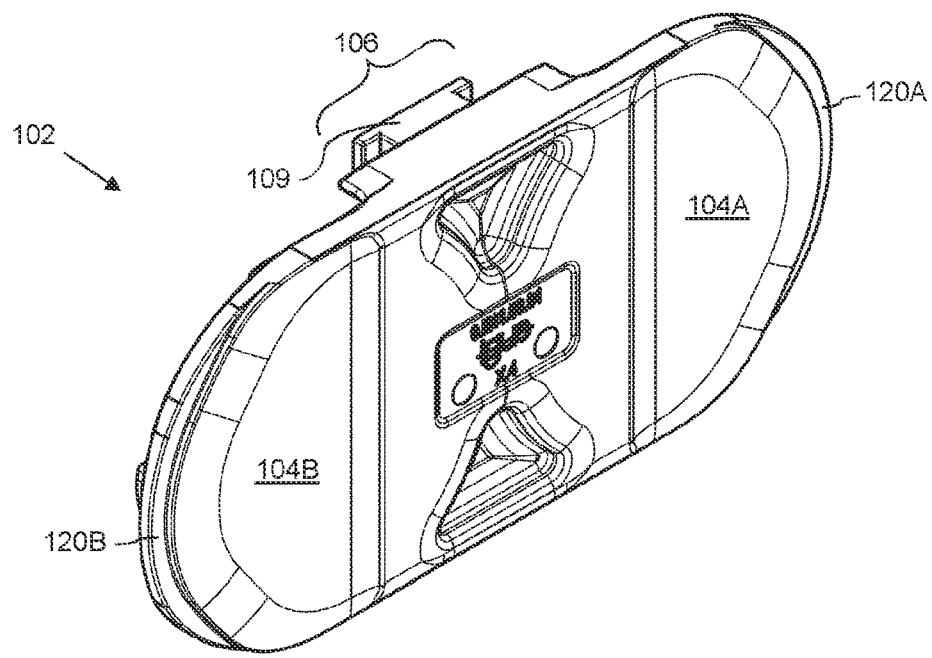
FIGS. 2A-2B are perspective views of an outer plate matching the inner plate according to FIGS. 1A-1C, from the outside (FIG. 2A) and from the inside (FIG. 2B)
Figure 2B:
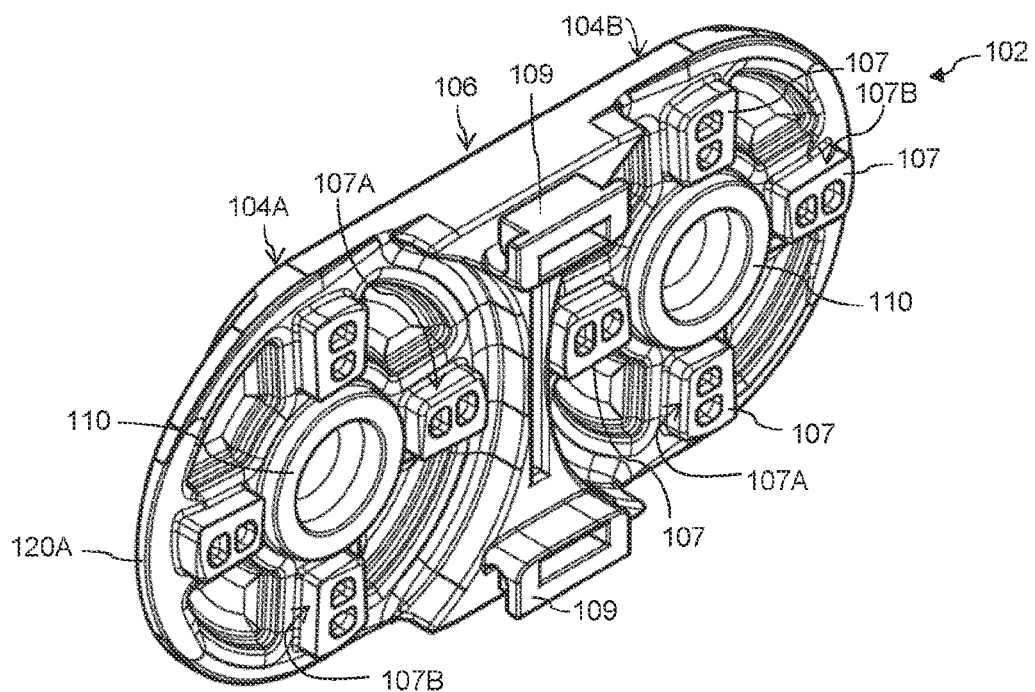

The inner plates 101 have two overlap regions 103A, 103B which are mirror-symmetrical relative to the cross-sectional plane through the plate center (vertical central plane M of the plate), which overlap regions form a closed surface facing the inside of the energy guide chain (FIG. 1B). The overlap regions 103A, 103B cooperate with complementary, mirror-symmetrical overlap regions 104A, 104B of the outer plate 102 (FIGS. 2A-2B). Between the overlap regions 103A, 103B and 104A, 104B respectively there is in each case located a central region 105 or 106 respectively which protrudes outward or inward and in places has a greater wall thickness.

To form an articulated joint, by way of which the plates 101, 102 are connected articulatedly in a plane (plane of FIGS. 1A/1B) in each case swivelably about their swivel axis A (perpendicular to the plane of FIGS. 1A/1B), the outer sides of the overlap regions 103A, 103B each have a central pin receptacle 112 coaxial to the swivel axis A, into which there in each case engages a matching central swivel pin 110 of the overlapping overlap region 104A, 104B of an outer plate 102. The swivel pin 110 is here embodied on the outer plate 102 in the manner of a hollow shaft to save materials and protrudes centrally in one piece from the inside of the overlap regions 104A, 104B (FIG. 2B). In this way, a further pin 113, which protrudes coaxially in the pin receptacle 112, may engage in the cavity of the swivel pin 110 to increase the tensile strength of the joint. Of particular note is the comparatively large outer diameter of the swivel pin 110, which here amounts for example to h or 35% of the plate height H. In a manner known per se, chain links are produced by connecting two opposing inner plates 101 and outer plates 102 using crosspieces. To this end, identically constructed crosspieces (not shown), the length of which predetermines the inner width, are mounted on fastening lugs 109. The identically constructed fastening lugs 109 protrude toward the inside and are located in the central region 105 or 106 respectively centrally at the lengthwise halfway division point. Suitable crosspieces are preferably flared at their ends such that crosspieces fastened in each case to the central region 106 of the outer plate 102 engage over the internal wall of the adjoining overlap region 103A, 103B of the inner plate 101.

To delimit the swivel angle or to adjust the chain radius in the deflection arc of the energy guide chain (not shown) or pretensioning, four identical stop projections 107 are here in each case provided on the inside of the outer plate 102, protruding parallel to the swivel pin 110.

The stop projections 107 are made in one piece with the body of the outer plate 102 and distributed rotationally symmetrically or uniformly about the swivel axis A. Each stop projection 107 is approximately trapezoidal in cross-section and in each case forms on the long sides two first,  predominantly level stop surfaces 107A, 107B, which face away from one another. Matching these, each of the overlap regions 103A, 103B of the inner plate 101 has four stop pockets 108 rotationally symmetrical relative to the swivel axis A for receiving the stop projections 107. The stop pockets 108 are here provided in the plate body as recesses or cutouts on the outside of the overlap regions 103A, 103B (FIG. 1A) of the inner plate. Each stop pocket 108 forms predominantly planar counter stop surfaces 108A, 108B for the corresponding stop surfaces 107A, 107B on the engaging stop projection 107. The swivel angle range is determined inter alia by the open angular width about the swivel axis A between the opposing counter stop surfaces 108A, 108B. The counter stop surfaces 108A, 108B are additionally connected stably by pocket bottoms, which close the stop pockets 108 on the inside (cf. FIG. 1B). Substitution with stop projections and swivel pins on the inner plate and corresponding receptacles on the outer plate would in principle be equivalent.

In comparison with the closest prior art, it is here necessary in particular to take account of the fact that, in the inner half of each overlap region 103A, 103B facing the central region 105, a stop pocket 108 is provided in which, as may be seen below, a corresponding stop projection 107 may also be introduced in the inner half at the overlap region 104A, 104B of the outer plate 102. This position is advantageous for strength due to the reinforcement provided by the central region 105, 106. A corresponding rotationally symmetrical stop arrangement is also possible with just three stop projections 107 and the corresponding stop pockets 108.

Figure 3B:
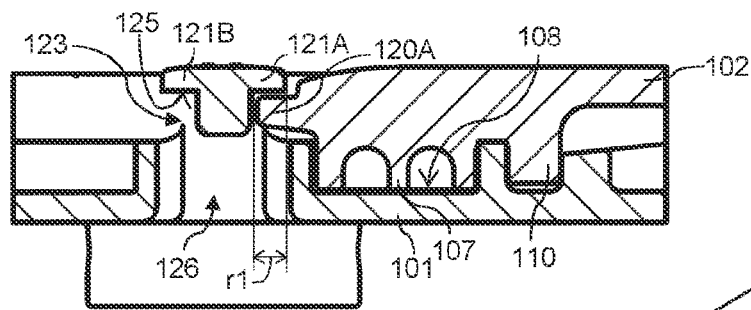
FIG. 3B shows a partial longitudinal section corresponding to FIG. 1C, but with inserted outer plate as shown in FIG. 3A, to illustrate lateral stabilization by engagement behind the retaining projection.
Figure 3A:
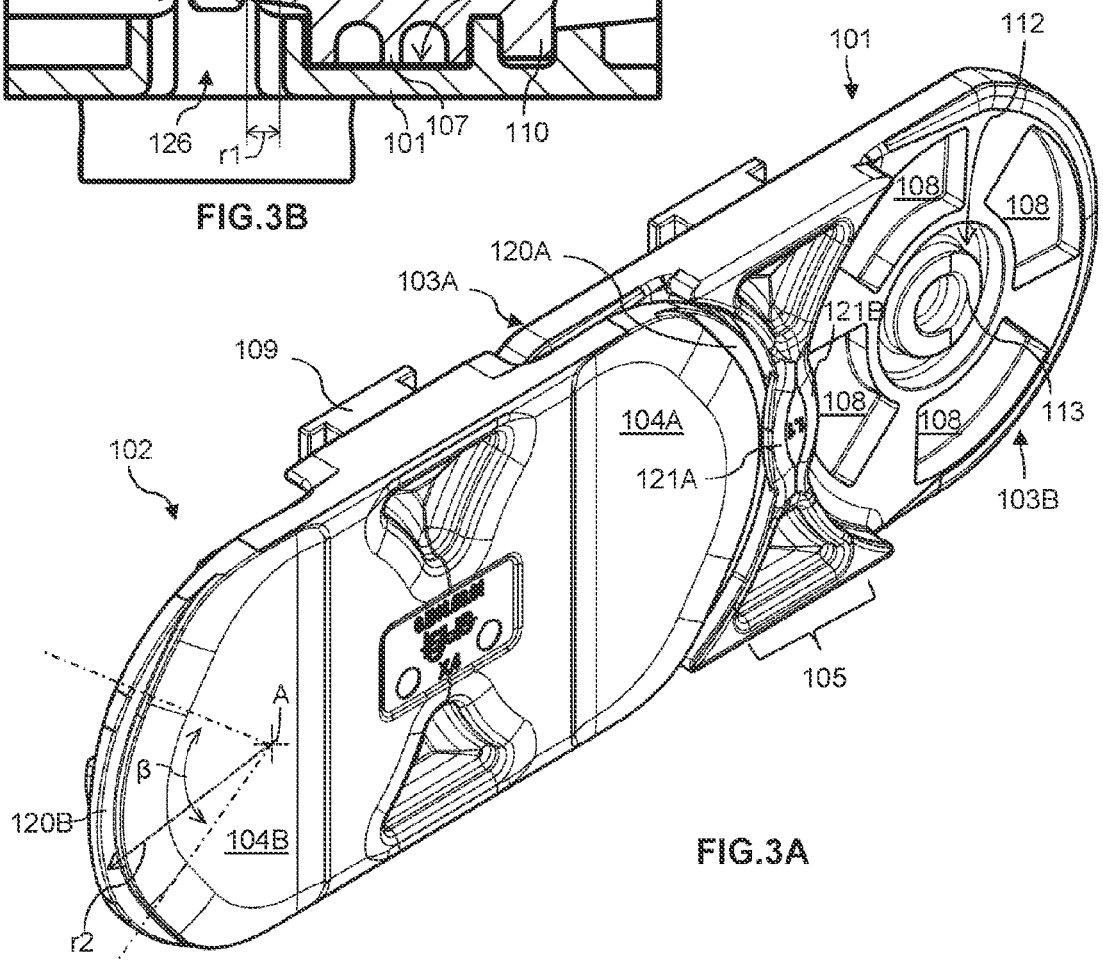
FIG. 3A is a perspective view of a plate pair with an inner plate according to FIGS. 1A-1C and an outer plate according to FIGS. 2A-2B.

FIG. 3A shows two plates 101, 102 in the assembled state. In this case, an inner plate 101 is linked with an outer plate 102 swivelably, force-transmittingly and with a limit stop effect, such that the swivel pin 110 engages in the pin receptacle 112 and the stop projections 107 in the stop pockets 108. For lateral stabilization, the outer plate 102 engages with one of two symmetrical guide regions 120A extending parallel to the swivel plane behind a retaining projection 121A, which is provided on the outside of the central region 105. Two identical retaining projections 121A, 121B, in each case for a guide region 120A or 120B respectively of two outer plates 102 connected to this inner plate 101, are provided mirror-symmetrically relative to the vertical central plane of the plate on the central region 105 of the inner plate 101. The retaining projections 121A, 121B are arranged substantially parallel to the swivel plane and project from the central region 105 in the direction of the respectively adjacent swivel axis. FIG. 3A shows the extended relative position of the two plates 101, 102; however, the area of engagement behind the guide region 120A remains identical over the entire swivel region apart from in the fully swiveled relative position (not shown). The guide regions 120A, 120B are in each case circular arc segments about the swivel axis A and form an outer front-end region of the respective overlap region 104A, 104B of the outer plate 102, which adjoins the central region 105 of the inner plate 101. Each of the end guide regions 120A, 120B has in side view the shape of a circular arc segment and is embodied with a substantially continuously constant cross-section, wherein insertion bevels are possible on the inner side in the central region (cf. FIG. 2B). As shown in FIG. 3B, each guide region 120A, 120B is set back step-wise cross-sectionally relative to the outer surface of the plate 102, in particular relative to the adjoining cross-section of the overlap region 104A, 104B, optionally with an oblique or rounded transition (cf. FIG. 2A).

Each retaining projection 121A, 121B is symmetrical to the longitudinal and vertical central plane of the inner plate 101 and extends in spatially restricted manner over a central height portion of the plate height H, with a useful or effective height dimension h1 for engagement purposes (cf. FIG. 1B), wherein the ratio h1/H preferably amounts to <40%, here for example around 30%. Furthermore, each retaining projection 121A, 121B is also of limited dimensions when viewed in the circumferential direction or swivel direction about the swivel axis. This dimensioning of the retaining projection 121A, 121B is selected such that the engaging, circular arc-shaped guide region 120A, 120B is always engaged over by only a relatively small proportion, for example <40%, particularly preferably ≤33%, of its arc length or angular width of the retaining projection 121A, 121B (cf. FIG. 3B). FIG. 1A (right-hand side) illustrates by way of example the comparatively small effective angular width α, here around 30°, of the retaining projection 121A, 121B. The angular width α here denotes the angle of a ray through the starting point of engagement beneath the retaining projection 121A, 121B and a ray through the corresponding end point, with the swivel axis A as the vertex of the angle. Accordingly, with regard to its overall useful arc length or angular width β, here around 90°, a predominant proportion (β-α) of the guide region 120A, 120B is never engaged over by the associated retaining projection 121A, 121B, as is apparent by way of example for the extended position from FIG. 3A. The useful angular width β of the guide regions 120A, 120B is dependent on the desired swivel range of the plates relative to one another or the radius of curvature of the energy guide chain and is typically between around 90° to around 150° and optionally up to almost 180°. The retaining projection 121A, 121B is preferably limited in the circumferential direction to a maximum angular width α, over which it can be engaged behind, of ≤45°.

Figure 1C:
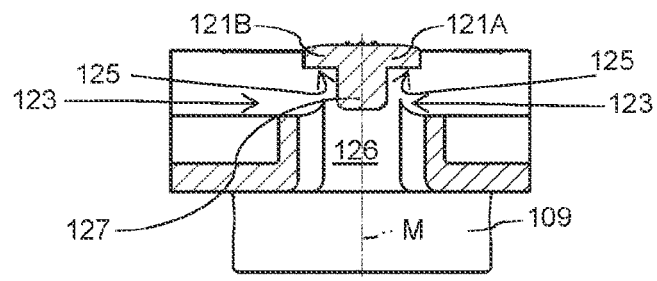

As is clearest from a comparison of the enlarged partial cross-sections in FIG. 1C (only inner plate 101) and FIG. 3B (inner plate 101 and outer plate 102, assembled), the guide region 120A or 120B respectively always engages with slight movement clearance transversely of the swivel plane into a space 123 behind the respective retaining projection 121A or 121B. Therein, the guide region 120A or 120B respectively is stopped or retained under traverse loading in the lateral direction by a planar inner surface 125 on the rear of the retaining projection 121A, 121B facing the inside of the chain. The inner surfaces 125 extend parallel to the swivel plane.

The outer flank of the guide regions 120A, 120B is accordingly in each case embodied planar and parallel to the swivel plane, i.e. according to a sector of a circular disk.

As FIG. 3B shows, in this case the radial engagement depth r1 (FIG. 3B) of the guide region 120A, 120B into the space 123 covered by the retaining projection 121A, 121B is selected to be as small as possible, but sufficient for the desired lateral stability. Due to a suitably small amount of protrusion of the retaining projection 121, 121B (FIG. 3B), the maximum engagement depth r1 in the longitudinal central plane of the plate (cf. section plane C-C in FIG. 1B) is set for example at 15% and preferably 12.5% of the circular arc radius r2 (FIG. 3A) of the guide region 120A, 120B.

FIG. 1C and FIG. 3B moreover show a plate opening 126 extending through the central region 105 of the inner plate 101, which each retaining projection 121A, 121B covers at least laterally.

The plate opening 126 extends perpendicular to the swivel plane or parallel to the swivel axis A as far as the remote side surface of the inner plate 101, as shown in FIG. 1B, and opens there, optionally with flaring. In the exemplary embodiment shown, the two retaining projections 121A, 121B laterally cover a continuous and/or common plate opening 126 through the central region 105. The plate opening 126 merges in open manner with the spaces 123 or encompasses these. Accordingly, on assembly the guide region 120A, 120B may in each case protrude obliquely slightly into the plate opening 126. As FIGS. 1A-1C show, the plate opening 126 has an edge-free, here substantially elliptical outline in the main plane of the plate (FIG. 1B). The edge 128, facing the overlap region, of the plate opening 126 is in each case aligned congruently on both sides with the protruding edge 131A, 131B of the retaining projection 121A, 121B. The blind hole-like plate opening 126 enables simplified production of the inner plate 101, in particular of the retaining projections 121A, 121B, using simple, sliderless injection molding tools. All that is needed for this purpose is a positive mold conjugate with the plate opening 126 as a stationary projection in a mold half, the shaping of which defines the rear of the retaining projections 121A, 121B, in particular the inner retaining surfaces 125. In this case, a reinforced material bridge 127 is preferably co-molded in one piece between the retaining surfaces 125 and/or at the front end of the plate opening 126, from which material bridge 127 the retaining projections 121A, 121B protrude laterally. In the exemplary embodiment shown, the material bridge 127 bridges the plate opening 126 in the direction of the plate height H and serves to reinforce the retaining projections 121A, 121B against transverse forces. Owing to the material bridge 127, the retaining projections 121A, 121B are connected to the rest of the plate by way of a region of comparatively greater material thickness.

As FIG. 1A shows, the central region 105 of the inner plate forms, in each case mirror-symmetrically relative to the longitudinal central plane of the plate (cf. C-C in FIG. 1B) and the vertical central plane M of the plate, two projection-less transverse wall regions 124 in the form of a circular arc about the swivel axis. Each retaining projection 121A, 121B ends in each case either side in a transition to a corresponding projection-less transverse wall region 124, the angular width of which is preferably greater than that of the respective retaining projection 121A, 121B. Each transverse wall region 124 here extends from the retaining projection 121A, 121B in each case almost as far as the corresponding narrow side of the inner plate 101. The front-end transverse wall regions 124 of the central region 105 are perpendicular to the main plane of the plate and merge, optionally with a rounded or edge-free transition, with the overlap regions 103A, 103B.

As FIG. 1A further illustrates, the edge 131A, 131B, protruding respectively relative to the adjacent swivel axis A, of the retaining projection 121A, 121B bulges convexly toward the swivel axis A, accordingly congruently with the outline of the plate opening 126.

Figure 4:
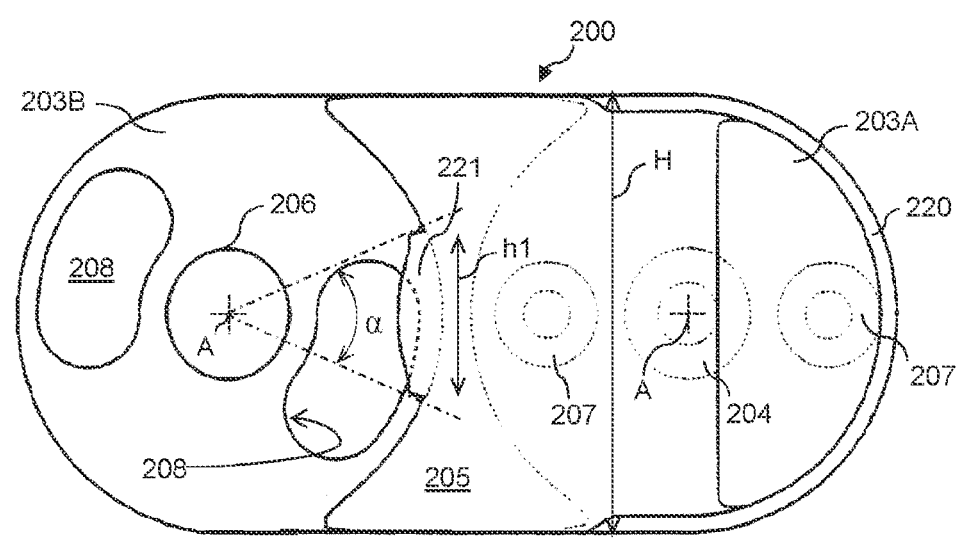
FIG. 4 is a schematic side view from the outside of an offset plate according to a second exemplary embodiment.

FIG. 4 shows, as a further exemplary embodiment, in side view and entirely schematically, an offset link plate 200, which is made in one piece of plastics material by injection molding. The outwardly offset overlap region 203A has on its inside a joint pin 204 molded in one piece with the link plate 200 for engagement (perpendicular to the plane in FIG. 4) into a joint receptacle 206 in the inwardly offset overlap region 203B of an adjoining, identically constructed link plate, to form a swivel joint about the respective swivel axis A. The overlap region 203A furthermore has on its inside two stop projections 207, in this case cylindrical and protruding in one piece, these being arranged diametrically opposingly relative to the swivel axis A on the longitudinal central plane of the plate. To limit the swivel angle, the stop projections 207 engage in two corresponding arcuate cutouts 208 on the outside of the overlap region 203B of an adjoining link plate 200. Of note is the arrangement of in each case one stop projection 207 and a corresponding cutout 208 in the inner half of the overlap regions 203A, 203B in the immediate vicinity of the reinforced central region 205. This is made possible by dimensioning according to the invention of a retaining projection 221 provided for lateral stabilization. The retaining projection 221 on the central region 205 here forms a circular arc-shaped channel for engagement of a guide region 220, extending parallel to the swivel plane, at the front end of the overlap region 203A of an adjoining, identically constructed plate. In FIG. 4, the guide region 220 is embodied by way of example as a projecting circle segment extending over 180° and has a smaller wall thickness at least relative to the greater wall of the central region 205.

The retaining projection 221 for lateral stabilization protrudes in one piece from the central region 205 and is likewise of limited dimension in the circumferential direction about the swivel axis, for example with a considerably smaller angular width α compared to the guide region 220 and extends over only a small central proportion h1 of the plate height H. Here too, therefore, in a manner similar to FIGS. 1A-3B, the circular arc-shaped guide region 220 is predominantly not engaged over by the retaining projection 221. This enables, inter alia a larger introduction angle on assembly of two offset link plates 200 according to FIG. 4, so in turn enabling greater design latitude with regard to position and dimensioning, in particular of the stop projections 207 and associated cutouts 208. With regard to other per se known features of offset plates, the teaching of DE 3 531 066 C2 is here included by way of example.

Despite spatially limited and material-saving dimensioning, retaining projections 121A, 121B or 221 according to the invention achieve high levels of stability against the plate tilting, bending up or breaking out of the swivel plane.

LIST OF REFERENCE SIGNS

FIGS. 1A-3A
101 Inner plate
102 Outer plate
103A, 103B Overlap region (inner plate)
104A, 104B Overlap region (outer plate)
105 Central region (inner plate)
106 Central region (outer plate)
107 Stop projection
107A, 107B Stop surfaces
108 Stop pocket
108A, 108B Counter stop surfaces
109 Fastening lug (for crosspiece)
110 Swivel pin
112 Pin receptacle (swivel pin)
120A, 120B Guide region
121a, 121b Retaining projection
123 Space
124 Transverse wall region
125 Inner retaining surface
126 Plate opening
127 Material bridge
128 Edge (plate opening)
131A, 131B Convex edge (retaining projection)
α Angular width (retaining projection: FIG. 1A)
α Useful angular width (guide region: FIG. 3A)

A Swivel axis
H Plate height
h1 Effective height dimension
M Vertical central plane of the plate
r1 Radial engagement depth (FIG. 3B)
r2 Circular arc radius (guide region: FIG. 3A)
FIG. 4
200 Offset link plate
203A, 203B Overlap region
204 Joint pin
205 Central region
206 Joint receptacle
207 Stop projection
208 Cutout
220 Guide region
221 Retaining projection
α Angular width (retaining projection)
A Swivel axis
H Plate height
h1 Effective height dimension

What is claimed is:

1. An energy guide chain, to guide at least one line between two connection points using chain links, with each chain link having two opposing plates formed of plastic material which are connected together by at least one crosspiece, the energy guide chain comprising:
two strings of plates, with each string having an alternating succession of inner plates and outer plates, the inner plates having inner overlap regions facing an inside of the chain and the outer plates having outer overlap regions, with which adjacent plates of each string of plates overlap and are connected together articulatedly and swivelably in a swivel plane about a swivel axis and over a swivel angle,
wherein, for at least one occurrence of the adjacent plates of each string, a first plate of the adjacent plates engaging for lateral stabilization with a circular arc-shaped guide region extending parallel to the swivel plane into a space behind a retaining projection on a second plate of the two adjacent plates, and
wherein the retaining projection is spatially limited to a central vertical portion of a plate height and is of limited dimension in a circumferential direction about the swivel axis, in that the circular arc-shaped guide region is arranged such that the circular arc-shaped guide region engages into the space of the retaining projection in each swivel position throughout the swivel angle, and in that the retaining projection has limited dimensions such that in each swivel position the circular arc-shaped guide region is engaged over by the retaining projection only over a minor proportion of an arc length or angular width of the circular arc-shaped guide region and such that in each swivel position the circular arc-shaped guide region is not engaged over by the retaining projection over a predominant major proportion of the arc length or the angular width of the circular arc-shaped guide region by the retaining projection;
wherein the retaining projection covers a plate through opening, which extends through a central region of the plate to a remote side surface of the plate and is open at the remote side.

2. The energy guide chain according to claim 1, wherein each retaining projection is arranged within an angular range α<60° bisected by a longitudinal central plane of the plate, about an adjacent swivel axis, and wherein the retaining projection is delimited in a circumferential direction about the swivel axis such that the circular arc-shaped guide region is covered in each swivel position over a maximum angle about the swivel axis amounting to <60°.

3. The energy guide chain according to claim 1, wherein:
the predominant major proportion is ≥66% of the arc length or the angular width of the circular arc-shaped guide region, and/or
a radial engagement depth of the circular arc-shaped guide region into the space behind the retaining projection is less than 15% of a circular arc radius of the circular arc-shaped guide region.

4. The energy guide chain according to claim 1, wherein:
the retaining projection is connected in one piece to the plate via a material bridge with a greater wall thickness than the retaining projection.

5. The energy guide chain according to claim 1, wherein the plate through opening has an edge-free outline in a main plane of the plate and/or an opening edge of the plate through opening is aligned congruently with a protruding edge of the retaining projection.

6. The energy guide chain according to claim 1, wherein, to limit a swivel angle, one overlap region has at least three projections which each form two planar stop surfaces, and the overlap region complementary thereto has at least three corresponding receptacles which each have two planar counter stop surfaces.

7. The energy guide chain according to claim 6, wherein each of the overlap regions has stop projections and a one-piece swivel pin, wherein both the stop projections and the swivel pin protrude laterally staggered relative to the circular arc-shaped guide region and/or from the swivel plane opposite the retaining projection.

8. The energy guide chain according to claim 1, wherein each plate has an outer plate surface and an inner plate surface and the retaining projection does not protrude laterally beyond an outer plate surface and/or terminates flush with the outer plate surface.

9. The energy guide chain according to claim 1, wherein the retaining projection forms an inner retaining surface for overlapping the circular arc-shaped guide region.

10. The energy guide chain according to claim 1, wherein the retaining projection is arranged mirror-symmetrically to a longitudinal central plane of the plate and/or symmetrically to a vertical central plane of the plate.

11. The energy guide chain according to claim 10, wherein a projection-less transverse wall region extends on each side, mirror-symmetrically relative to the retaining projection.

12. The energy guide chain according to claim 1, wherein a protruding edge of the retaining projection bulges outward convexly relative to the swivel axis.

13. The energy guide chain according to claim 1, wherein the circular arc-shaped guide region has a circular arc segment protruding at a front end on the overlap region, which segment has a cross-section which is set back relative to an outer surface of the overlap region.

14. The energy guide chain according to claim 1, wherein the retaining projection and/or the circular arc-shaped guide region are/is arranged such that the circular arc-shaped guide region engages into the space of the retaining projection substantially over the entire swivel angle.

15. The energy guide chain according to claim 1, wherein the inner plates and the outer plates are made in one piece from an injection-moldable plastic material.

16. The energy guide chain according to claim 1, wherein: each of the inner plate and the outer plate have two opposing overlap regions and one central region located therebetween, and both plates being embodied for unilateral overlapping with their overlap regions,
the outer plate having, in each overlap region, a swivel pin in one piece therewith and the inner plate having, in each overlap region, a corresponding pin receptacle molded therein,
the inner plate and the outer plate connectable together swivelably in a plane about a swivel axis and over a swivel angle via the swivel pin and the pin receptacle of one of the overlap regions, respectively,
the inner plate having two retaining projections for lateral stabilization in one piece on the central region and each retaining projection projecting over an associated space,
the outer plate having a circular arc-shaped guide region extending parallel to the swivel plane for lateral stabilization at a front end in one piece at each overlap region and being able to engage into the space behind a retaining projection,
wherein
on the central region of the inner plate, each retaining projection is of limited dimension in a circumferential direction about the swivel axis, such that in each swivel position the circular arc-shaped guide region of the engaging outer plate is predominantly not engaged over by the retaining projection, and
the retaining projection and the circular arc-shaped guide region are arranged such that the circular arc-shaped guide region engages in each swivel position throughout a swivel angle into the space behind the retaining projection.

17. A plastic plate for an energy guide chain, the plastic plate comprising:
two opposing overlap regions and a central region located therebetween,
each overlap region having either a swivel pin in one piece therewith or a pin receptacle molded therein, to connect overlapping plates together swivelably in a swivel plane about a swivel axis and over a swivel angle,
two retaining projections provided in one piece on the central region and each retaining projection projecting over an associated space, into which an adjoining outer or inner plate are engageable for lateral stabilization with a circular arc-shaped guide region extending parallel to the swivel plane,
wherein each retaining projection covers a plate through opening, which extends through a central region of the plate to a remote side surface of the plate and is open at the remote side,
wherein each retaining projection is of limited dimension in a circumferential direction about the swivel axis, such that in each swivel position the circular arc-shaped guide region of an engaging plate is predominantly not engaged over by the retaining projection, and/or
wherein the retaining projection and the circular arc-shaped guide region are arranged such that the circular arc-shaped guide region engages in each swivel position throughout the swivel angle into a space behind the retaining projection.

18. The plastic plate according to claim 17, wherein each retaining projection is arranged within an angular range <60° bisected by a longitudinal central plane of the plate, about the adjacent swivel axis.

* * * * *